(12) United States Patent
Schell et al.

(10) Patent No.: US 9,338,649 B2
(45) Date of Patent: *May 10, 2016

(54) WIRELESS NETWORK AUTHENTICATION APPARATUS AND METHODS

(71) Applicant: Apple Inc., Cupertino, CA (US)

(72) Inventors: Stephan V. Schell, San Mateo, CA (US); Mohit Narang, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,728

(22) Filed: Mar. 3, 2014

(65) Prior Publication Data

US 2014/0248854 A1 Sep. 4, 2014

Related U.S. Application Data (63) Continuation of application No. 12/952,082, filed on Nov. 22, 2010, now Pat. No. 8,666,368.

(60) Provisional application No. 61/330,856, filed on May 3, 2010.

(51) Int. Cl.
*H04M 1/00* (2006.01)
*H04W 12/06* (2009.01)
(Continued)

(52) U.S. Cl.
CPC ............... *H04W 12/06* (2013.01); *H04B 1/406* (2013.01); *H04L 63/062* (2013.01);
(Continued)

(58) Field of Classification Search
CPC ..... H04W 88/06; H04W 48/18; H04W 12/08; H04W 12/06; H04W 24/02; H04W 36/14; H04W 8/02; H04W 12/00; H04W 36/08; H04W 36/18; H04W 40/00; H04W 48/08; H04L 47/2408; H04L 63/08
USPC ............... 455/552.1, 436, 418, 450, 407, 410, 455/419, 435.2; 370/259, 338, 328
IPC .................... H04W 88/06, 48/18, 12/08, 12/06, H04W 24/02, 36/14, 8/02, 12/00, 36/08, H04W 36/18, 40/00, 48/08; H04L 47/2408, H04L 63/08
See application file for complete search history.

(56) References Cited

U.S. PATENT DOCUMENTS

2007/0149170 A1    6/2007  Bloebaum et al.
2008/0051062 A1*   2/2008  Lee ............................. 455/411
(Continued)

FOREIGN PATENT DOCUMENTS

KR    1020080021178    3/2008

OTHER PUBLICATIONS

Korean Patent Application No. 10-2012-7031593—Office Action dated Mar. 26, 2014.

*Primary Examiner* — Fred Casca
(74) *Attorney, Agent, or Firm* — Downey Brand LLP (57) ABSTRACT

Apparatus and methods for authenticating and granting a client device (e.g., cellular telephone) access to a network. In one embodiment, a network service provider such as a cellular telephone company may distribute user access (e.g., Universal Subscriber Identity Module or "USIM") credentials to a service manager via a USIM vendor. The services manager may maintain a list of authorized users. A user at a client may authenticate to the services manager. Once authenticated, the services manager may provide the user with a set of USIM credentials. When the user desires to use wireless network services, the user equipment may establish a wireless link between the user equipment and the network service provider. During authentication operations, the user equipment may use the USIM credentials to authenticate to the network service provider. Following successful authentication, the network service provider may provide the user equipment with wireless services.

20 Claims, 9 Drawing Sheets

(51) Int. Cl.
*H04W 88/06* (2009.01)
*H04W 48/18* (2009.01)
*H04B 1/403* (2015.01)
*H04L 29/06* (2006.01)
*H04W 12/04* (2009.01)
*H04W 4/00* (2009.01)
*H04W 48/08* (2009.01)

(52) U.S. Cl.
CPC .......... *H04L 63/0853* (2013.01); *H04W 12/04* (2013.01); *H04W 48/18* (2013.01); *H04W 88/06* (2013.01); *H04W 4/00* (2013.01); *H04W 48/08* (2013.01)

(56) References Cited

U.S. PATENT DOCUMENTS

| | | | |
|---|---|---|---|
| 2008/0300008 A1* | 12/2008 | Kim | 455/552.1 |
| 2009/0172419 A1* | 7/2009 | Takayama | 713/193 |
| 2009/0181721 A1* | 7/2009 | Nishizawa et al. | 455/558 |
| 2010/0293217 A1* | 11/2010 | Srinivasan et al. | 709/202 |
| 2011/0093339 A1* | 4/2011 | Morton | 705/14.58 |

* cited by examiner

WIRELESS NETWORK AUTHENTICATION APPARATUS AND METHODS

CROSS-REFERENCE TO RELATED APPLICATIONS

This application is a continuation of U.S. patent application Ser. No. 12/952,082 filed on Nov. 22, 2010 and entitled "WIRELESS NETWORK AUTHENTICATION APPARATUS AND METHODS" which claims the benefit of U.S. Provisional Application No. 61/330,856 filed May 3, 2010 entitled "WIRELESS NETWORK AUTHENTICATION SYSTEM" and is related to co-owned and co-pending U.S. patent application Ser. No. 12/952,089, filed on Nov. 22, 2010 and entitled "APPARATUS AND METHODS FOR PROVISIONING SUBSCRIBER IDENTITY DATA IN A WIRELESS NETWORK", the contents of which are incorporated herein by reference in their entirety for all purposes.

BACKGROUND OF THE INVENTION

1. Field of Invention

The present invention relates generally to the field of communications systems, and more particularly in one exemplary aspect, to wireless systems that allow user devices to authenticate to wireless networks (e.g., cellular networks, WLANs, WMANs, etc.) using access control clients.

2. Description of Related Technology

Wireless systems are used to provide, inter alia, voice and data services to user equipment such as cellular telephones and computers.

Conventionally, user equipment is provided with a Subscriber Identity Module (SIM) card. The SIM card includes security information such as private key information that can be used in authenticating user equipment to a cellular network.

It may not always be desirable to require the use of SIM cards. For example, the need to include a SIM card slot in user devices tends to make the devices bulky and add cost. It also necessitates management of SIM card inventories and distribution by the manufacturer or service provider.

A user might also want to purchase wireless services even when the user is not able to easily obtain a SIM card.

It would therefore be desirable to be able to provide improved ways in which to provide users with the ability to purchase and use wireless network services.

SUMMARY OF THE INVENTION

The present invention addresses the foregoing needs by providing, inter cilia, apparatus and methods for wireless network authentication.

In one aspect of the invention, a network service provider such as a cellular telephone company may distribute access client (e.g., Universal Subscriber Identity Module (USIM)) credentials to a trusted services manager via a USIM vendor or directly.

The trusted services manager may maintain a list of authorized users. These users may be, for example, customers of the trusted services manager or an associated entity. User credentials may be maintained by the trusted services manager for each of the authorized users.

A user at user equipment may authenticate to the trusted services manager using a set of user credentials. Once authenticated, the trusted services manager may provide the user with a set of USIM credentials. The USIM credentials may be stored in a secure element on the user equipment.

When the user desires to use wireless network services, the user equipment may establish a wireless link between the user equipment and the network service provider. During authentication operations, the user equipment may use the USIM credentials that are stored in the secure element on the user equipment to authenticate to the network service provider. Following successful authentication, the network service provider may provide the user equipment with wireless services (e.g., cell phone voice and data connectivity).

In another aspect of the invention, a method for providing wireless services to a user at user equipment is disclosed. In one embodiment, the method includes: distributing access client data to a first entity; conveying the access client data from the first entity to a second entity over a first communications link; using user credentials to authenticate the user equipment; and after authenticating the user equipment, transferring the access client data from the second entity to the user equipment over a second communications link.

In one variant of the method, the first entity includes a USIM vendor, and the second entity includes a trusted services manager.

In another variant of the method, the access client includes a Universal SIM (USW), and the trusted services manager performs the authenticating.

In a further variant, the transferring of access client data causing the user equipment to store the access client data to a secure element.

In yet another variant, the second communications link includes a secure wireless connection.

In still another variant, the first communications link additionally includes delivering a physical storage device containing USIM data.

In another variant, the user credentials includes account information specific to the user.

In another aspect of the invention, a wireless apparatus is disclosed. In one embodiment, the apparatus includes: one or more communication links adapted to communicate with a services provider; a secure element configured to store an access client; a processor; and a storage device in data communication with the processor, the storage device comprising computer-executable instructions. The instructions are configured to, when executed by the processor: authenticate to the services provider, wherein said successful authentication results in the provision by the services provider of the access client; and responsive to receiving the access client, store the access client within the secure element.

In one variant of the apparatus, the user equipment includes either or both long-range and short-range wireless communications circuitry.

In another variant, the user equipment additionally includes Near Field Communications (NFC) circuitry.

In a further variant, the secure element is a tamper-proof integrated circuit that is permanently built into the apparatus.

In another variant, the secure element is adapted to authenticate the user equipment to a network service, based at least in part on the access client data.

In another aspect of the invention, a method for securely storing access client data at a user device is disclosed. In one embodiment, the method includes: transmitting one or more user credentials to a services provider, the transmitting causing the services provider to authenticate the user equipment based at least in part on the one or more user credentials; once successful authentication of the user equipment has been accomplished, receiving the access client data over a communications link; and storing the access client data within a secure element.

In one variant, the communications link includes short-range wireless communications circuitry, such as Near Field Communications (NFC) circuitry.

In another variant, the secure element is a tamper-proof integrated circuit that is permanently built into the apparatus.

In a further aspect of the invention, a Subscriber Identity Module (SIM) accessory apparatus is disclosed. In one embodiment, the apparatus includes: one or more communication links adapted to communicate with a cellular device; a receptacle; a processor; and a storage device in data communication with the processor, the storage device comprising computer-executable instructions. The computer-executable instructions are configured to, when executed by the processor: notify the cellular device of the presence of a SIM device having first SIM data stored thereon within the receptacle; and responsive to receiving a request for SIM operation, provide access to the SIM device via the one or more communication links.

In one variant, the cellular device includes a secure element, the secure element configured to store one or more second SIM data.

In yet another aspect of the invention, a computer readable medium is disclosed. In one embodiment, the medium includes a secure element (e.g., secure integrated circuit) having access client (e.g., virtual USIM) data stored thereon, the data when accessed allowing for user access to one or more network services.

Further features of the invention, its nature and various advantages will be more apparent from the accompanying drawings and the following detailed description of the preferred embodiments.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE INVENTION

Reference is now made to the drawings wherein like numbers refer to like parts throughout.

Those of ordinary skill in the related arts will recognize that various embodiments of the present invention are useful for both prior art architectures (e.g., USIM data embodied within a physical SIM card), and new architectures (e.g., USIM data stored within a secure element). In some variants, the present invention may further enable combinations of both prior art card operation and secure element operation, enabling support for legacy SIM cards that aren't stored within the secure element.

In one exemplary embodiment of the present invention, SIM data includes high security contents useful for inter alia, authentication (e.g., keys, and encryption algorithms, etc.). For example, high security contents may comprise an authentication key (Ki), and all encryption algorithms (e.g., F1, F2, F3, F4, and F5, as described in 3GPP TS 35.205 V9.0.0 published Dec. 31, 2009 and entitled "*Specification of the MILENAGE Algorithm Set: An example algorithm set for the 3GPP authentication and key generation functions f1, f1\*, f2, f3, f4, f5 and f5\**", the foregoing being incorporated herein by reference in its entirety). In another embodiment, SIM data includes operator bundle information, and/or user data information. Examples of the such information include, network selection parameters, identification information, operator data, application data, etc.

Common examples of network selection parameters include, without limitation: Public Land Mobile Network Selector (PLMNSel), Forbidden PLMN (FPLMN), Home PLMN (HPLMN), etc.

Common examples of identification information include, without limitation: International Mobile Subscriber Identity (MST), Integrated Circuit Card ID (ICCID), Temporary Mobile Subscriber Identity (TMSI), Packet TMST (P-TMSI), and Mobile Subscriber Integrated Services Digital Network Number (MSISDN).

Typical operator data may include, for example: Operator controlled PLMN (OPLMN) list SPN (Service Provider Name), PLMN Network Name (PNN) for name display, Emergency Control Center (ECC) for emergency calls, and other call categories, etc.

Examples of application data include, without limitation, the SIM Application Toolkit (STK) (e.g., Roaming Broker, Enhanced Network Selection (ENS), International Mobile Equipment Identity (IMEI) change applications, etc.)

Prior Art Authentication Procedures—

Figure 1:
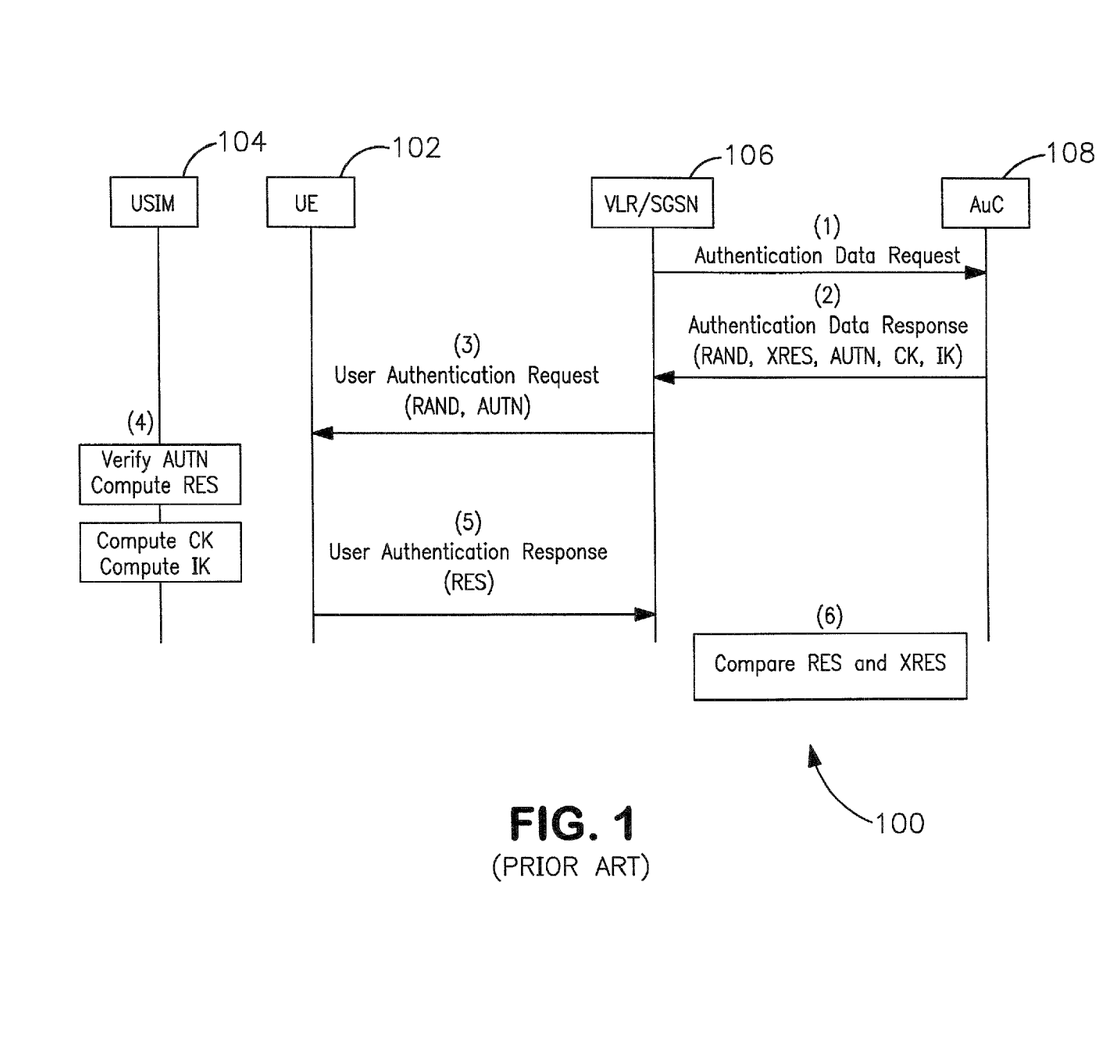
FIG. 1 is a diagram of a prior art Authentication and Key Agreement (AKA) procedure.

As a brief aside, FIG. 1 illustrates a typical prior art Authentication and Key Agreement (AKA) procedure 100 in the exemplary context of a UMTS cellular system. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC 108 of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

Figure 2:
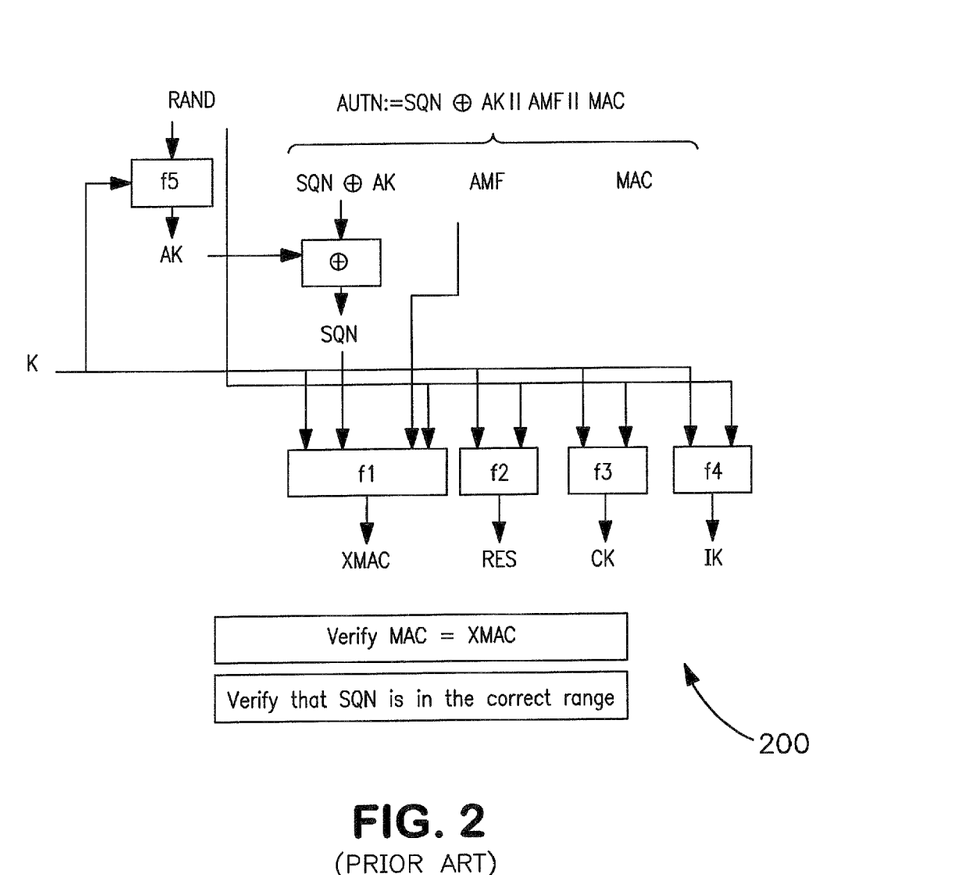
FIG. 2 is a diagram of a prior art AKA operations performed by the USIM.

FIG. 2 graphically illustrates the prior art AKA operations 200 performed by the USIM to verify the received AUTN. The USIM uses cryptographic functions F1, F2, F3, F4, and F5, (see 3GPP TS 35.205 V9.0.0, previously incorporated by reference in its entirety), the stored key K and the received AUTN and RAND. Using the RAND and K as inputs to F5, the USIM computes the AK (Anonymity Key). A SQN (Sequence Number) is generated by XOR'ing (exclusive OR) the AK with the first field of the AUTN. Using the RAND, K, SQN, and AMF as inputs to F1, F2, F3, and F4, the USIM computes the XMAC (Expected Message Authentication Code), RES, CK and IK. Thereafter the UE compares the XMAC with the MAC of the AUTN; if they are different the UE sends an authentication failure message back to the VLR/SGSN (Visitor Location Register/Serving GPRS Support Node) with an indication of the cause, and abandons the procedure.

In one implementation, if the XMAC matches the MAC then the UE verifies that the SQN is in an acceptable range, and sends an authentication response message back to the VLR/SGSN, which includes the computed result RES. Alternately, if the SQN is not acceptable, then the UE performs the re-synchronization procedure and sends a synchronization failure message back to the VLR/SGSN.

Figure 3:
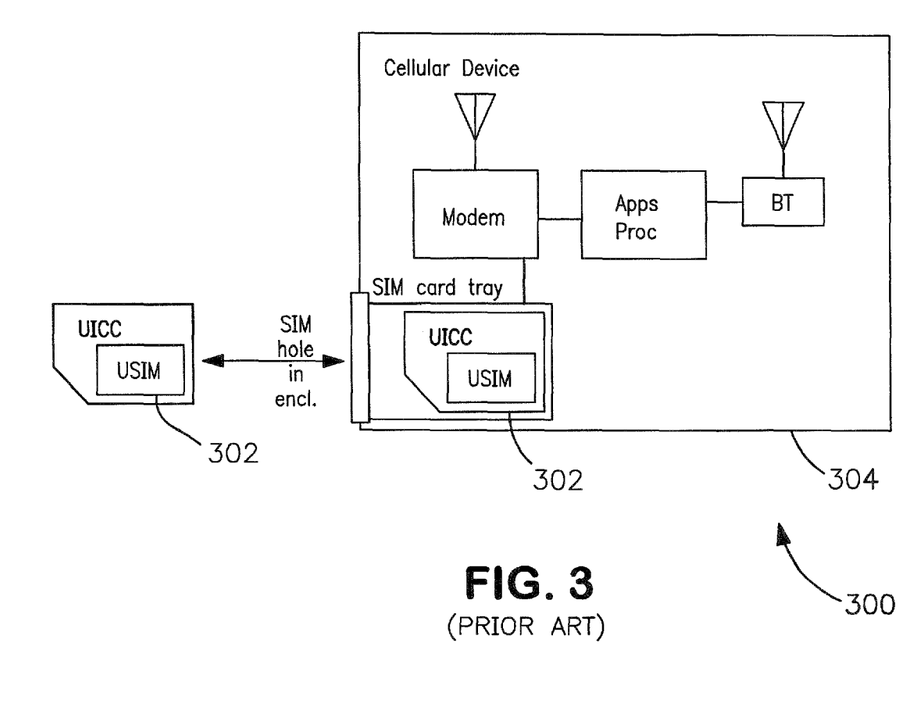
FIG. 3 is a diagram of a prior art hardware architecture for Subscriber Identity Modules (SIMs).

After successfully completing the foregoing procedure, the UE and UTRAN are in agreement on the CK and IK, and can activate ciphering and integrity protection. Referring now to FIG. 3, a typical prior art hardware architecture 300 for Subscriber Identity Modules (SIMS) is illustrated. As shown, a USIM 302 is stored on a Universal Integrated Circuit Card (UICC), adapted for insertion within a cellular device 304. The USIM executes the software procedures necessary for the AKA procedure (as described in FIGS. 1 and 2). The secure UICC stores secret keys known only to the USIM and the network, and maintains internal counters (e.g., state) related to security transactions. The physical form factor of the USIM can be delivered physically e.g., via an in-box, mail, kiosk, etc.

Exemplary Embodiments

Figure 4:
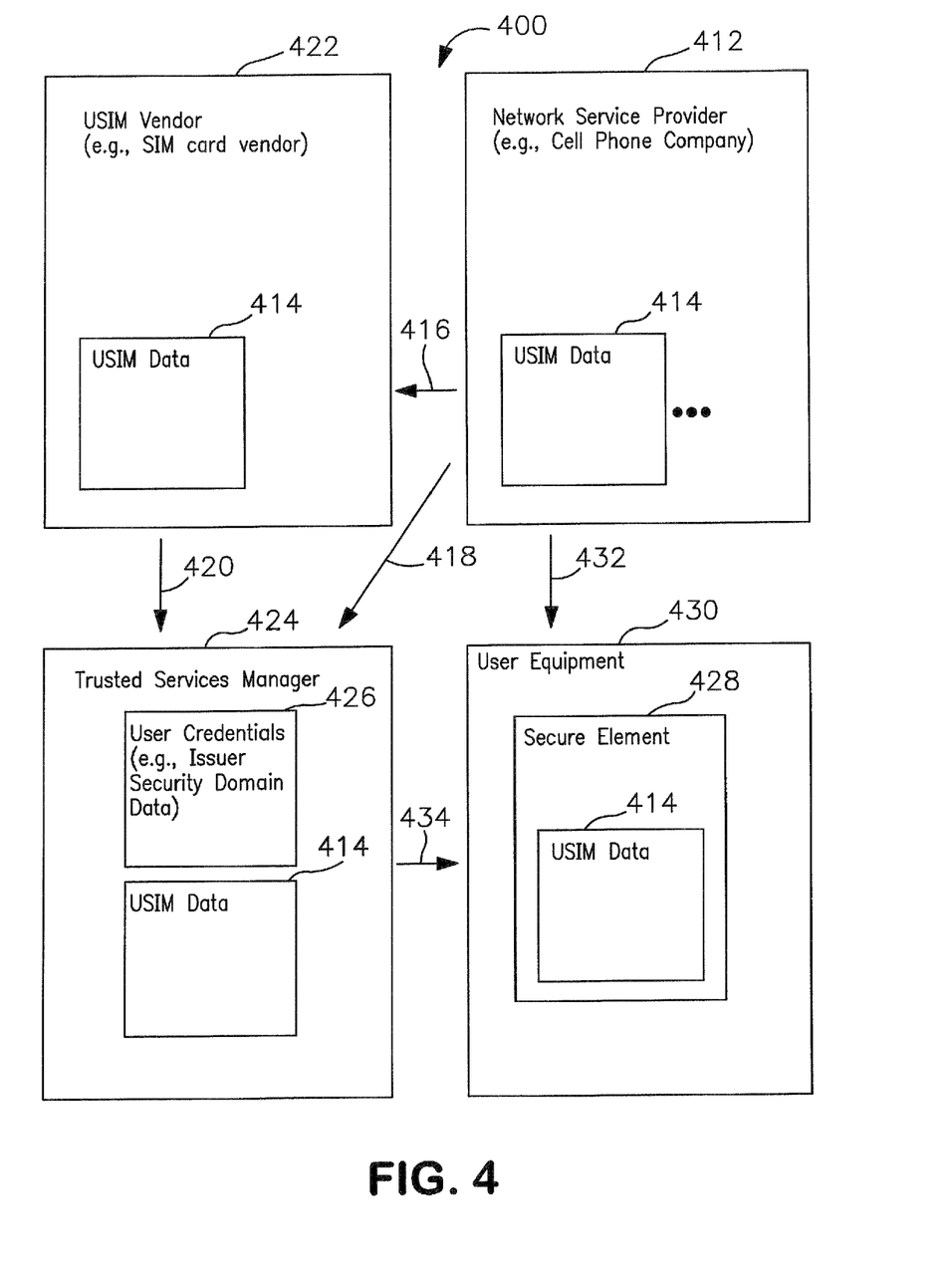
FIG. 4 is a diagram of an illustrative wireless system in accordance with an embodiment of the present invention.

An exemplary embodiment of a wireless system 400 in which a user at user equipment 430 may obtain wireless network services from a network service provider 412 according to the present invention is shown in FIG. 4. The user equipment 430 may be, for example, a cellular telephone or smartphone, a table-top computer, laptop computer, or other suitable computing equipment. If properly authorized, the user equipment 430 may communicate with the network service provider 412 over the wireless link 432.

The user equipment 430 may have wireless communications circuitry. For example, the user equipment 430 may use long-range wireless communications circuitry such as cellular telephone circuitry to communicate over the link 432 using cellular telephone bands at 850 MHz, 900 MHz, 1800 MHz, and 1900 MHz (e.g., the main Global System for Mobile Communications or GSM cellular telephone bands). Long-range wireless communications circuitry in the user equipment 430 may also accommodate e.g., the 2100 MHz band. If desired, the user equipment 430 may also use short-range wireless communications links to effect communications with nearby equipment. For example, electronic devices may communicate using the WiFi® (IEEE 802.11) bands at 2.4 GHz and 5 GHz and the Bluetooth® band at 2.4 GHz.

The network service provider 412 may require that wireless users properly authenticate before services are provided. For example, the network service provider 412 may maintain Universal Subscriber Identity Module (USIM) information 414 that is used in determining whether a given user is authorized to use the services of provider 412. Unauthorized users (e.g., users who do not have active accounts) will be denied service. Authorized users will be allowed to establish links (such as the link 432) to make and receive voice telephone calls, to download and upload data, or to otherwise obtain the services available from the network service provider 412.

Conventionally, the USIM data 414 is distributed to authorized users in the form of Subscriber Identity Module (SIM) cards. This approach generally requires the availability of a SIM card slot in the user's equipment.

With arrangements of the type shown in FIG. 4, it is advantageously not necessary for the user equipment 430 to receive the USIM data 414 in the form of a removable SIM card. Rather, USIM data may be distributed using wired and/or wireless network connections.

As an example, the USIM data 414 can be distributed to user equipment 430 from the network service provider 412 directly or using one or more intermediate entities such as a USIM vendor 422 and/or a trusted services manager 424.

In one exemplary implementation, the network service provider 412 may distribute USIM data 414 for multiple users to a USIM vendor 422 over a link 416. The link 416 may be a secure wired or wireless link, or may involve physical delivery of a storage device containing the USIM data 414.

The USIM vendor 422, which may be for example an organization that manufactures SIM cards, may distribute the USIM data to the trusted services manager(s) 424 over a link 420 (alternatively, trusted services manager may obtain the USIM data directly from the network services provider 412 over another link 418).

The trusted services manager 424, which may be for example an organization that sells user equipment 430 or an entity that is associated with a vendor of equipment 430, may maintain a database of user credentials 426. The user credentials can be used to establish which users are authorized customers of the trusted services manager and/or are authorized to obtain network access from the network service provider 414. For example, the user credentials 426 may include account information that users of the user equipment 430 established when purchasing the user equipment 430 (or soon thereafter). The user credentials 426 may, for example, include username and password information, credit card information, and other information that may be used to establish the identity of authorized users.

The trusted services manager 424 can in one embodiment perform account management tasks associated with maintaining user accounts (i.e., with maintaining the user credentials 426 and determining which of the users associated with user credentials 426 are authorized to obtain the USIM data 414 to authorize their user equipment). A web site, and customer service representatives available by telephone, can be linked into the computing equipment of the trusted services manager 424. The web site may be used, for example, to allow a user to establish an account and an associated set of user credentials, purchase wireless services (to be used with the provider 412), to make other purchases from the trusted services manager 424, etc.

In a typical scenario, a user of the user equipment 430 communicates with the trusted services manager 424 over a link 434. The link 434 may include for example wired and wireless links between the equipment 430 and manager 424. If desired, intermediate equipment (e.g., a personal computer with which the user equipment 430 connects using e.g., a universal serial bus connection) may be included in the path 434.

While communicating with the trusted services manager 424, the user equipment 430 provides user credentials to the trusted services manager. The trusted services manager authenticates these credentials using in one embodiment a user credential database 426.

If the user equipment is successfully authenticated, the trusted services manager 424 may provide appropriate USIM data 414 to the user equipment 430 over a secure channel in the link 434. The user equipment 430 may store the USIM data that is received in this way if desired, such as in a secure element 428. The secure element 428 may be e.g., a tamper-proof integrated circuit that is permanently built into user equipment 430, or may be a removable element.

After the USIM data 414 has been stored in the user equipment 430, the user equipment can use the stored USIM data to request wireless services from a network service provider 412. Once the user equipment 430 is authenticated to the network service provider 412, the network service provider may provide the user equipment 430 with wireless services such as voice call and data link connectivity using the wireless path 432.

Figure 5A:
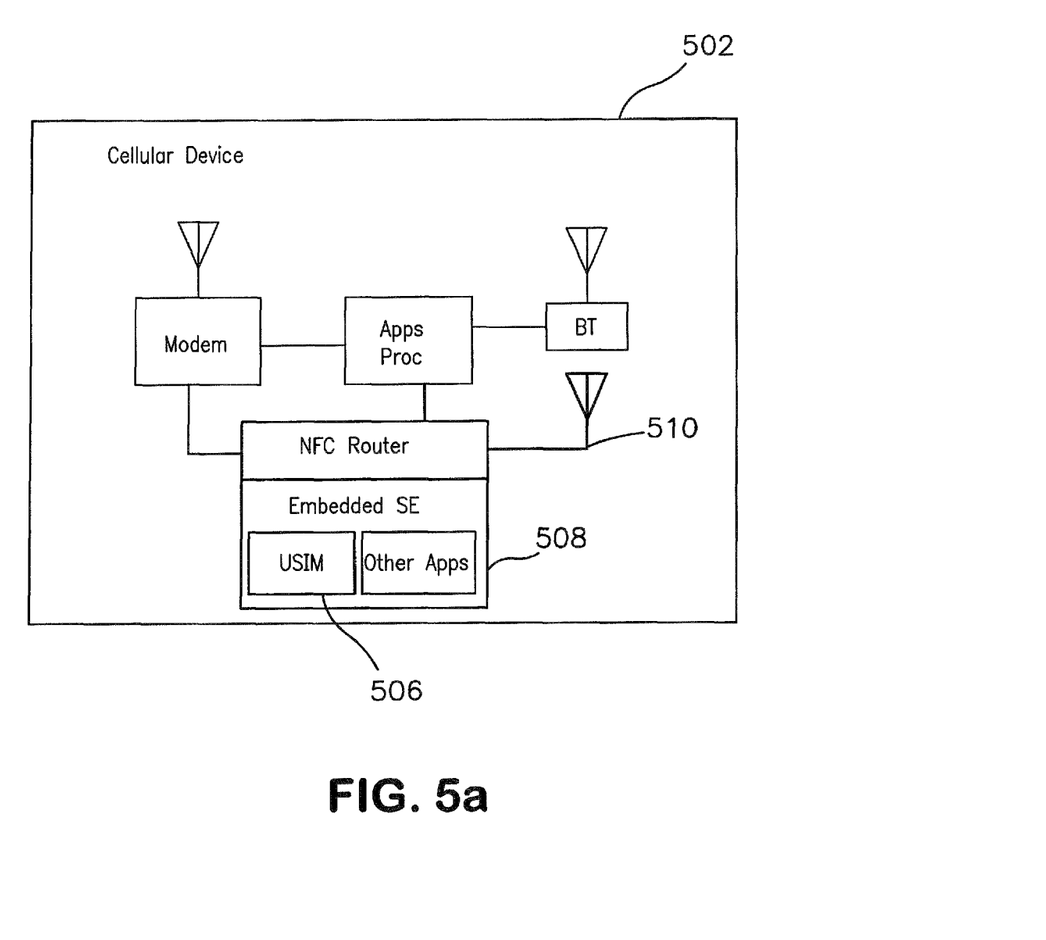
FIG. 5a is a functional block diagram of a first exemplary embodiment of a hardware architecture for "virtual" Subscriber Identity Modules (SIMs) in accordance with the present invention.
Figure 5B:
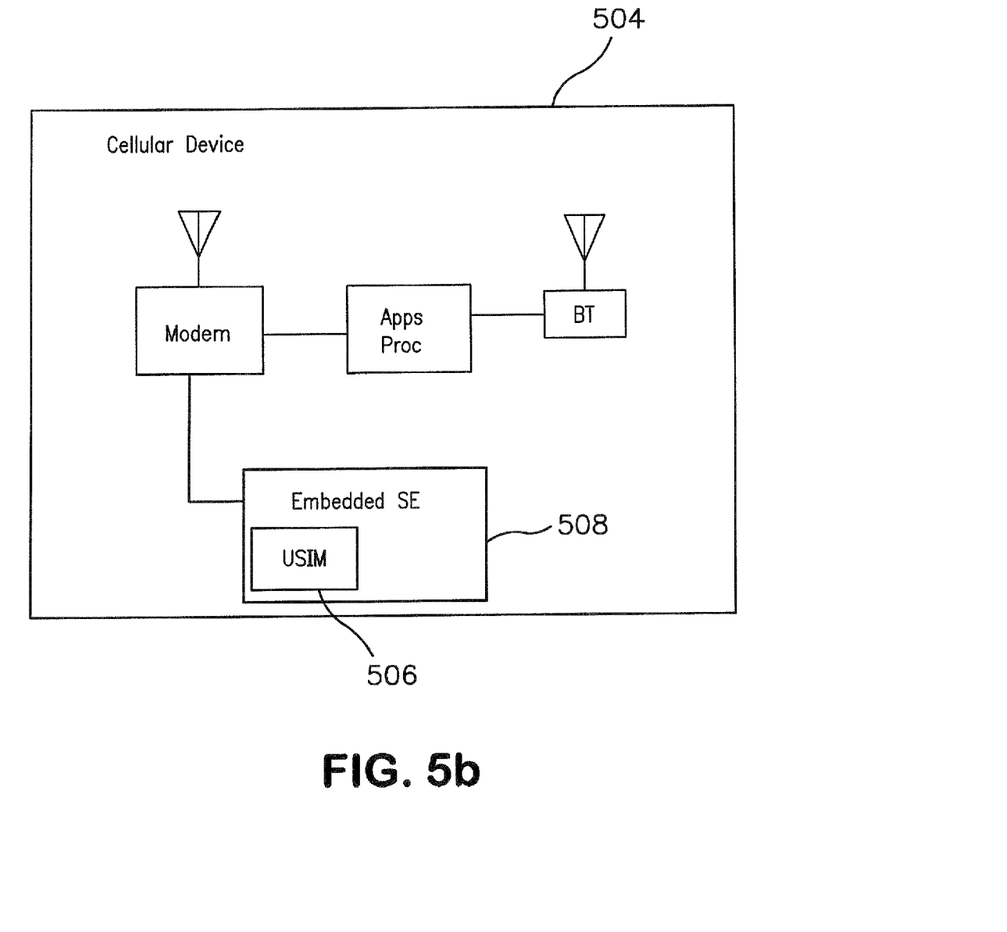
FIG. 5b is a functional block diagram of a second exemplary embodiment of a hardware architecture for "virtual" Subscriber Identity Modules (SIMs) in accordance with the present invention.

Referring now to FIGS. 5a and 5b, two exemplary embodiments of a hardware architecture (502, 504) for "virtual" Subscriber Identity Modules (SIMs) according to the invention are illustrated, respectively. Unlike the prior art solution of FIG. 3, the exemplary embodiments of FIGS. 5a and 5b store a USIM 506 within an embedded Secure Element (SE) 508, not a removable card. The first illustrated embodiment 502 of the present invention (FIG. 5a) additionally includes a Near Field Communication (NFC) router 510. The second illustrated embodiment 504 (FIG. 5b) does not comprise the NFC router.

Figure 6:
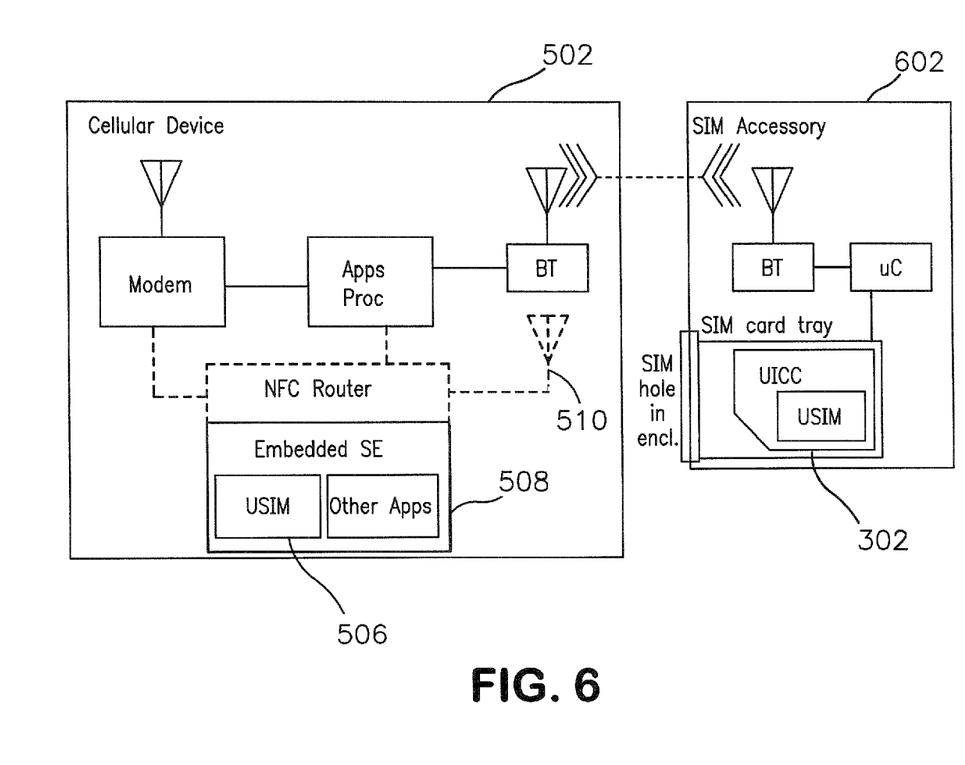
FIG. 6 is a diagram of one exemplary embodiment of the present invention operating in conjunction with a SIM accessory device, in accordance with the present invention.

FIG. 6 illustrates the first embodiment 502 of FIG. 5a, in conjunction with a SIM accessory device 602. As shown, the SIM accessory device 602 enables inter alia, transitional embodiments, and support for legacy architectures. Legacy embodiments may find particular value when adopted by frequent SIM-card "swappers", and/or carriers that are slow, or resistant to upgrading their existing networks. As shown in FIG. 6, the Bluetooth SIM Access Profile (SAP) provides the required functions (e.g., AKA protocol) normally executed by a physical SIM card inserted within the modem.

Figure 7:
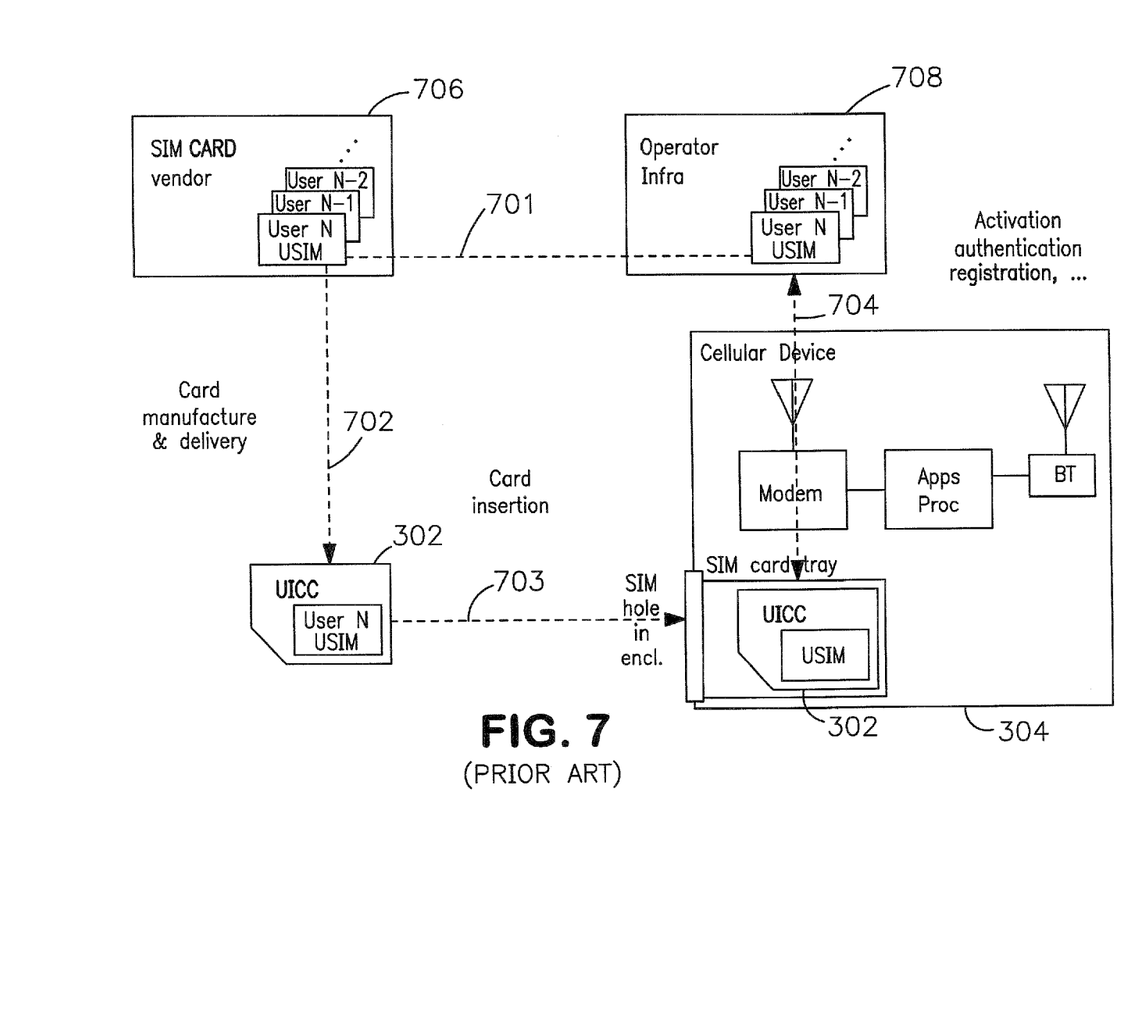
FIG. 7 is a diagram of a prior art method for deploying USIM to a cellular device.

As shown, when a SIM card 302 is inserted in the SIM accessory device slot, the accessory can communicate with the cellular device over the Bluetooth transceiver, and can be kept within a pocket, purse, etc. During normal operation, the cellular device (in communication with the accessory) asks the user if the external SIM should be used. If so, then the modem 502 accesses the external SIM 302 as needed, via the Bluetooth SAP. Referring now to FIG. 7, one prior art method for deploying USIM 302 is graphically illustrated. As shown, USIM data is generated at an operator 708, and at step 701 distributed to a SIM card vendor 706. Then, at step 702 the USIM is manufactured into UICCs 302 for sale to a user. Once the UICC has been inserted into the cellular device 304 at step 703, the cellular device and operator can execute the steps of activation, authentication, registration, etc. (step 704)

Figure 8:
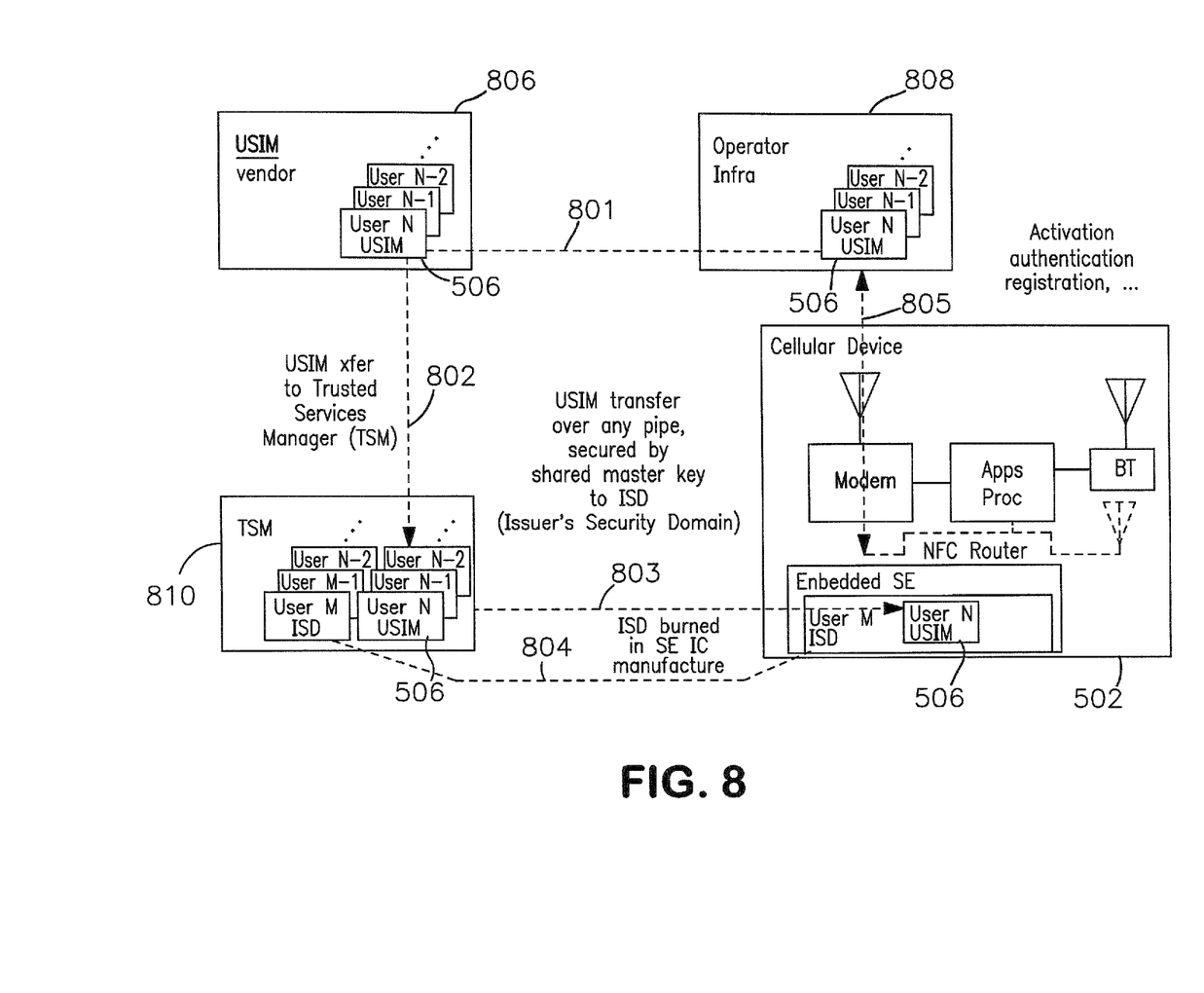
FIG. 8 is a diagram illustrating one exemplary method for deploying USIM information to a cellular device, in accordance with the present invention

In contrast, FIG. 8 illustrates one exemplary embodiment of a method for deploying USIM information 506, in accordance with the present invention. As shown at step 801, USIM data is generated at an operator 808, and distributed to a USIM vendor 806. The USIM vendor can transfer USIMs to e.g., a trusted services manager (TSM) 810 at step 802. The TSM provides the USIM to a cellular device 502 over any secure pipe (e.g., a wireless, or wired interface) (step 803). As shown, the secure pipe is based on an Issuer's Security Domain (ISD) (step 804) which is burned into the Secure Element (SE) during manufacture. Once the USIM is successfully transferred to the cellular device, the cellular device and operator can execute the steps of activation, authentication, registration, etc. (step 805)

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for accessing wireless services, the method comprising:
   by a processor included in a mobile device:
      presenting an option to select from:
         accessing a first wireless service using an access control client stored in a secure element included in the mobile device, and
         accessing a second wireless service using a physical SIM card inserted into a SIM card bay of an external accessory device that is in communication with the mobile device;
      receiving a selection in response to presenting the option; and
      accessing either the first wireless service or the second wireless service in accordance with the selection.

2. The method of claim 1, wherein the access control client is received from a trusted entity prior to receiving the selection, and the access control client comprises a virtualized Universal Subscriber Identity Module (USIM).

3. The method of claim 2, wherein the trusted entity is a USIM vendor associated with the first wireless service.

4. The method of claim 1, wherein the external accessory device is in wireless communication with the mobile device.

5. The method of claim 4, wherein the mobile device wirelessly communicates with the external accessory device using Near Field Communication (NFC) circuitry or Bluetooth circuitry.

6. The method of claim 1, wherein the access control client comprises account information that is specific to a user.

7. The method of claim 1, wherein the secure element comprises a tamper-proof integrated circuit that is permanently built into the mobile device.

8. The method of claim 1, wherein the mobile device includes long-range wireless communications circuitry.

9. A wireless apparatus, comprising:
one or more communication interfaces configured to communicate with wireless services;
a secure element configured to store at least one access control client;
a processor; and
a storage device in data communication with the processor, wherein the storage device stores computer-executable instructions that, when executed by the processor, cause the wireless apparatus to carry out steps that include:
presenting an option to select from:
accessing a first wireless service using the at least one access control client stored in the secure element, and
accessing a second wireless service using a physical subscriber identity module (SIM) card inserted into a SIM card bay of an external accessory device that is in communication with the wireless apparatus;
receiving a selection in response to presenting the option; and
accessing either the first wireless service or the second wireless service in accordance with the selection.

10. The wireless apparatus of claim 9, wherein the steps further include, prior to receiving the selection:
authenticating to a trusted services manager,
receiving, from the trusted services manager, the at least one access control client, and
storing the at least one access control client within the secure element.

11. The wireless apparatus of claim 9, wherein the external accessory device is in wireless communication with the wireless apparatus.

12. The wireless apparatus of claim 11, wherein the wireless apparatus communicates with the external accessory device using Near Field Communication (NFC) circuitry or Bluetooth circuitry.

13. The wireless apparatus of claim 9, wherein the secure element comprises a tamper-proof integrated circuit that is permanently built into the wireless apparatus.

14. The wireless apparatus of claim 9, wherein the at least one access control client comprises a virtualized Universal Subscriber Identity Module (USIM).

15. A non-transitory computer readable storage medium configured to store instructions that, when executed by a processor included in a mobile device, cause the mobile device to carry out steps that include:
presenting an option to select from:
accessing a first wireless service using an access control client stored in a secure element of the mobile device, and
accessing a second wireless service using a physical SIM card inserted into a SIM card bay of an external accessory device that is in communication with the mobile device;
receiving a selection in response to presenting the option; and
accessing either the first wireless service or the second wireless service in accordance with the selection.

16. The non-transitory computer readable storage medium of claim 15, wherein the access control client is received from a trusted entity prior to receiving the selection, and the access control client comprises a virtualized Universal Subscriber Identity Module (USIM).

17. The non-transitory computer readable storage medium of claim 16, wherein the trusted entity is a USIM vendor associated with the first wireless service.

18. The non-transitory computer readable storage medium of claim 15, wherein the external accessory device is in wireless communication with the mobile device.

19. The non-transitory computer readable storage medium of claim 18, wherein the mobile device accesses the external accessory device using Near Field Communications (NFC) circuitry or Bluetooth circuitry.

20. The non-transitory computer readable storage medium claim 15, wherein the secure element comprises a tamper-proof integrated circuit that is permanently built into the mobile device.

* * * * *